March 8, 1955  V. PAQUETTE  2,703,459

PUZZLE WORKING DEVICE

Filed June 23, 1952

Inventor:
Vincent Paquette
By
Attorney

United States Patent Office 2,703,459
Patented Mar. 8, 1955

2,703,459

PUZZLE WORKING DEVICE

Vincent Paquette, Montreal, Quebec, Canada

Application June 23, 1952, Serial No. 294,975

1 Claim. (Cl. 35—35)

The present invention pertains to a device for working puzzles such as crossword puzzles.

Ordinarily a crossword puzzle requires a diagram printed in a newspaper or a book, and a pen or pencil for writing in the spaces of the diagram.

The principal object of the invention is to provide an apparatus that replaces the printed sheet and writing implement and can be used repeatedly and indefinitely. Another object of the invention is to provide such a device that utilizes the co-ordinate system to locate any particular space for application of a character.

Still another object is to provide a guide rule for locating any particular space, as an aid in the use of the co-ordinate system. A further object is to provide a relatively simple, inexpensive and durable construction for the purposes set forth.

In the accomplishment of these objects, the invention provides a board, preferably rectangular, with marginal spaces along at least two perpendicular edges. Within the marginal spaces, the surface of the board is formed with similar, closely spaced sockets arranged in rows parallel to both margins.

The rows are numbered along the margins according to the co-ordinate system.

Lettered plugs are provided for insertion in the sockets, as directed by the terms of the puzzle. Each plug is blank or colored at one end for use in the blank spaces of the solved puzzle.

The guide rule is used as one of the ordinates, the other being taken on the perpendicular margin as will be shown. Four similar guide rules can be used to form a reduced board of square or rectangular form.

Figure 1:
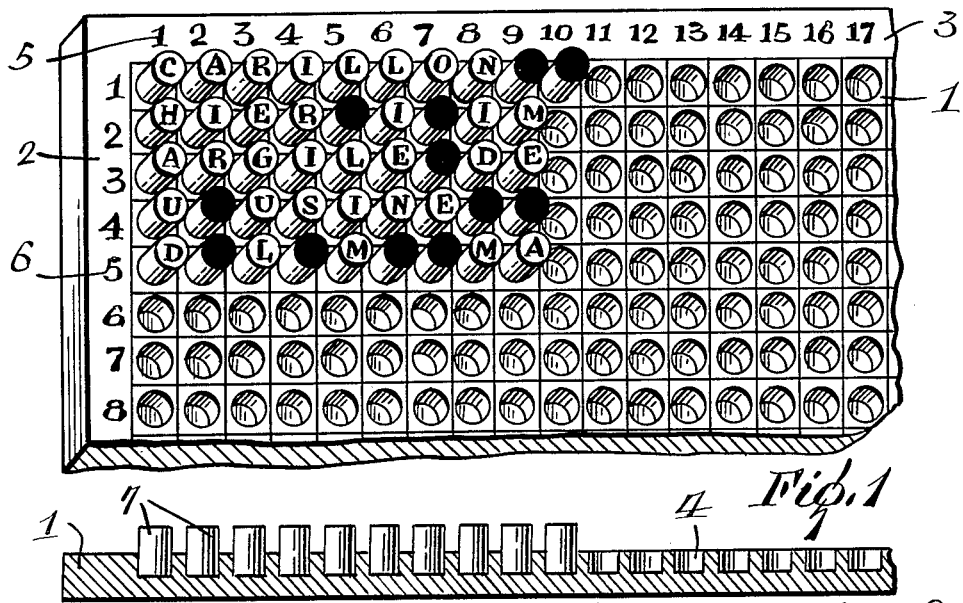
Figure 2:
Figure 3:
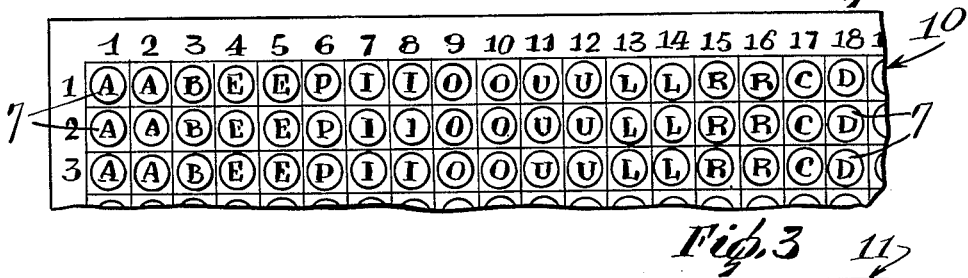
Figure 4:
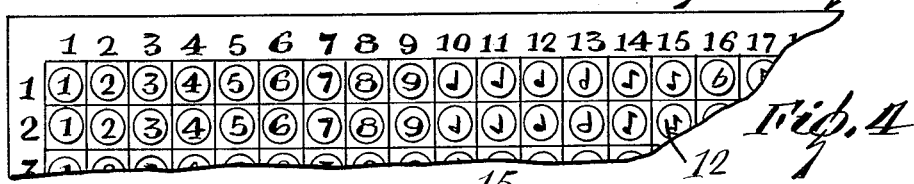
Figure 5:
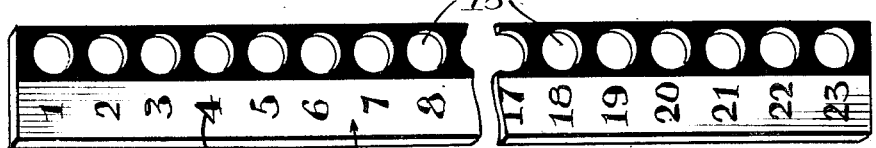
Figure 6:
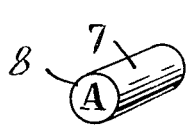
Figure 7:

The invention is fully disclosed by way of example in the following description and in the accompanying drawings in which:

Figure 1 is a top perspective view of the device;
Figure 2 is a cross section thereof;
Figure 3 is a plan view of a storage rack;
Figure 4 is a plan view of another such rack;
Figure 5 is a top perspective view of one guide rule; and
Figures 6 and 7 are perspective views of a plug.

Reference to these views will now be made by use of like characters which are employed to designate corresponding parts throughout.

In Figures 1 and 2 is shown a board 1 of suitable material and thickness. The board is preferably rectangular and formed with margins 2 and 3 along two perpendicular edges. The upper surface of the board is formed with sockets 4 shown as circular but of other shape, if desired, and all being of like shape and equal area. The sockets are closely spaced and are arranged in rows parallel to both margins 2 and 3. The rows are numbered consecutively along both margins, at 5 and 6, so that any socket can be located by the co-ordinate method.

A number of plugs 7 are provided for fitting interchangeably in the sockets. The plugs are of equal dimensions, and each is inscribed with a character 8 at one end and is blank or colored at the other end 9. More frequently, the characters are the letters of the alphabet.

In using the board and plugs to work a crossword puzzle, no diagram, pencil or pen is necessary. The definitions of the words are listed as usual, but are located by co-ordinates rather than by numerals applied to the spaces of a diagram.

The player is provided with an adequate supply of lettered plugs 7, and he inserts them in the socket 3 as if he were writing letters in the squares of the usual puzzle diagram. The blank ends 9 are exposed upward in the spaces that are to be left blank.

A similar board 10 is provided as shown in Figure 3, to hold the supply of plugs 7. Still another such board 11 may be furnished, as shown in Figure 4, to contain plugs 12 showing numerals, musical signs or other characters, for modified forms of puzzles.

The guide rule 13 may be provided to aid in locating any specified socket or for forming a reduced board. Four such guide rules 13 determine the size and form of said limitations. The rule is numbered at 14 to coincide with the marginal numberings, and adjacent to each numeral on the rule is an aperture 15. The apertures 15 are equal in size and spacing to the sockets 4. Thus, one of the specified co-ordinates is taken on a margin and the other on the rule; and the plug is passed through the corresponding aperture 15 into the proper socket.

Although a specific embodiment of the invention has been illustrated and described, it will be understood that various alterations in the details of construction may be made without departing from the scope of the invention as indicated by the appended claim.

What I claim is:

A puzzle working device comprising a board having marginal spaces along two perpendicular edges, a row of numerals on the surface of the board along each of said margins, said surface being formed with like sockets alined adjacent to the numerals on each of the margins and forming rows parallel to the margins, and plugs adapted to be fitted interchangeably in said sockets and being taller than the depth of said sockets, each plug having a character depicted on one end thereof, and a rule having a series of apertures adapted to coincide with a row of said sockets, and numerals on said rule adjacent to said apertures and corresponding to the numerals on one of said margins.

References Cited in the file of this patent

UNITED STATES PATENTS

| Number | Name | Date |
|---|---|---|
| 1,153,469 | Viall | Sept. 14, 1915 |
| 1,400,887 | Liebman | Dec. 20, 1921 |
| 1,581,937 | Leishman | Apr. 20, 1926 |
| 1,613,204 | Smith | Jan. 4, 1927 |
| 1,668,328 | Martien | May 1, 1927 |
| 1,769,961 | Norrell | July 8, 1930 |
| 2,055,159 | Scofield | Sept. 22, 1936 |